(12) United States Patent
Li

(10) Patent No.: US 12,522,214 B2
(45) Date of Patent: Jan. 13, 2026

(54) DETERMINATION OF DRIVING DIRECTION

(71) Applicant: BEIJING BAIDU NETCOM SCIENCE TECHNOLOGY CO., LTD., Beijing (CN)

(72) Inventor: Mei Li, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 211 days.

(21) Appl. No.: 18/076,220

(22) Filed: Dec. 6, 2022

(65) Prior Publication Data

US 2023/0097364 A1    Mar. 30, 2023

(30) Foreign Application Priority Data

Dec. 10, 2021 (CN) .......................... 202111507342.9

(51) Int. Cl.
    *B60W 30/18* (2012.01)
    *B60W 30/12* (2020.01)
    *B60W 50/00* (2006.01)
    *G06V 20/56* (2022.01)

(52) U.S. Cl.
    CPC ...... *B60W 30/18154* (2013.01); *B60W 30/12* (2013.01); *B60W 50/0097* (2013.01); *G06V 20/588* (2022.01); *B60W 2420/403* (2013.01); *B60W 2520/06* (2013.01)

(58) Field of Classification Search
    None
    See application file for complete search history.

(56) References Cited

U.S. PATENT DOCUMENTS

| | | | |
|---|---|---|---|
| 2004/0267423 A1* | 12/2004 | Iwazaki | B62D 15/0285 701/41 |
| 2014/0249748 A1* | 9/2014 | Strassenburg-Kleciak | G01C 21/3658 701/437 |
| 2015/0134204 A1* | 5/2015 | Kunihiro | B60R 21/00 701/41 |
| 2016/0102986 A1 | 4/2016 | Ma et al. | |

(Continued)

FOREIGN PATENT DOCUMENTS

| CN | 102074110 A | 5/2011 |
|---|---|---|
| CN | 112988927 A | 6/2021 |

(Continued)

*Primary Examiner* — James J Lee
*Assistant Examiner* — Melanie G Huber
(74) *Attorney, Agent, or Firm* — Leydig, Voit & Mayer, Ltd.

(57) ABSTRACT

A method for determining a driving direction is disclosed. The method includes: obtaining a driving route for a vehicle; determining a target intersection in the driving route, and obtaining border information about intersection range borders defining a range of the target intersection; predicting, based on the driving route and the border information corresponding to the target intersection, a first direction for the vehicle to enter the target intersection, a second direction for the vehicle to travel within the target intersection, and a third direction for the vehicle to leave the target intersection; and determining, based on the first direction, the second direction, and the third direction, a target driving direction for the vehicle to pass the target intersection.

14 Claims, 7 Drawing Sheets

(56) References Cited

U.S. PATENT DOCUMENTS

| | | | | |
|---|---|---|---|---|
| 2016/0148505 | A1* | 5/2016 | Mizuguchi | G08G 1/163 |
| | | | | 701/41 |
| 2017/0186314 | A1* | 6/2017 | Bernhardt | H04L 67/12 |
| 2018/0180432 | A1 | 6/2018 | Surnilla et al. | |
| 2019/0129437 | A1* | 5/2019 | Liu | G08G 1/056 |
| 2020/0189584 | A1* | 6/2020 | Nakanishi | B60W 50/0097 |
| 2020/0225044 | A1 | 7/2020 | Tohriyama et al. | |
| 2022/0219729 | A1* | 7/2022 | Xiao | B60W 60/0011 |
| 2023/0391325 | A1* | 12/2023 | Tsuchiya | B60W 30/12 |

FOREIGN PATENT DOCUMENTS

| | | |
|---|---|---|
| CN | 113763704 A | 12/2021 |
| EP | 2192554 A1 | 6/2010 |
| EP | 2482039 A2 | 8/2012 |
| EP | 2482039 A3 | 11/2014 |
| EP | 2848895 A1 | 3/2015 |

* cited by examiner

DETERMINATION OF DRIVING DIRECTION

CROSS-REFERENCE TO RELATED APPLICATIONS

This application claims priority to Chinese Patent Application No. 202111507342.9, filed on Dec. 10, 2021, the entire contents of which are hereby incorporated by reference.

TECHNICAL FIELD

The present disclosure relates to the technical field of data processing, and in particular to the technical field of intelligent transportation.

BACKGROUND

With the development of technologies, a user relies more and more on a navigation electronic map while traveling. When a vehicle passes an intersection in a driving process, the electronic map can guide the user to drive in an indicated direction. However, in life, it often happens that a direction indicated by the electronic map differs from an actual driving direction. For example, when the vehicle passes an intersection A, the actual driving direction is right front, while the direction indicated by the electronic map is left front. The direction indicated by the electronic map is incorrect. Therefore, how to accurately determine a driving direction for a vehicle to pass an intersection becomes a problem to be urgently solved.

SUMMARY

The present disclosure provides a method for determining a driving direction, a device, and a storage medium.

According to an aspect of the present disclosure, a method is provided for determining a driving direction, including:
 obtaining a driving route for a vehicle;
 determining a target intersection in the driving route, and obtaining border information about intersection range borders defining a range of the target intersection;
 predicting, based on the driving route and the border information corresponding to the target intersection, a first direction for the vehicle to enter the target intersection, a second direction for the vehicle to travel within the target intersection, and a third direction for the vehicle to leave the target intersection;
 determining, based on the first direction, the second direction, and the third direction, a target driving direction for the vehicle to pass the target intersection.

According to still another aspect of the present disclosure, an electronic device is provided, including:
 at least one processor; and
 a memory communicatively connected to the at least one processor, where
 the memory stores instructions executable by the at least one processor, which, when executed by the at least one processor, cause the at least one processor to perform the foregoing method for determining a driving direction.

According to yet another aspect of the present disclosure, a non-transitory computer-readable storage medium storing computer instructions is provided, where the computer instructions, when executed by a computer, cause the computer to perform the foregoing method for determining a driving direction.

By adopting solutions provided by embodiments of the present disclosure, a target driving direction for a vehicle to pass a target intersection can be accurately determined.

It should be understood that the content described in this section is not intended to identify critical or important features of the embodiments of the present disclosure, and is not used to limit the scope of the present disclosure either. Other features of the present disclosure will be easily understood through the following description.

BRIEF DESCRIPTION OF THE DRAWINGS

The accompanying drawings are used for a better understanding of the solutions, and do not constitute a limitation on the present disclosure, in which.

DETAILED DESCRIPTION

Example embodiments of the present disclosure are described below with reference to the accompanying drawings, where various details of the embodiments of the present disclosure are included for a better understanding, and should be considered as merely exemplary. Those of ordinary skill in the art should be aware that various changes and modifications can be made to the embodiments described herein, without departing from the scope and spirit of the present disclosure. For clarity and conciseness, descriptions of well-known functions and structures are omitted in the following description.

A navigation electronic map is an abstract representation of the real world, and a standard definition (SD) road network geometric shape is depicted based on an actual road center line, and is a representation of a real road. According to a standard definition of an SD intersection hooking model, a connection relationship is formed by a series of points and lines. In a process of route planning by the navigation map, when a user drives to an intersection, a voice broadcast is output to guide the user to drive correctly. A driving direction for the voice broadcast is computed based on an entry link and an exit link in the intersection hooking model. A basic principle of the intersection hooking model is to use the simplest model to abstract a traffic condition of a real intersection, with a hooked geometric shape matching a driving trajectory as much as possible. Therefore, there may be a curvature in a link geometric shape in some intersection hooking scenarios, which causes interference to the computation of the driving direction, and further causes the voice broadcast to depart from the expectation, making the user drive off course or feel hesitant and confused, resulting in the bad product experience.

A driving direction determination method provided in embodiments of the present disclosure will be described below.

Figure 1:
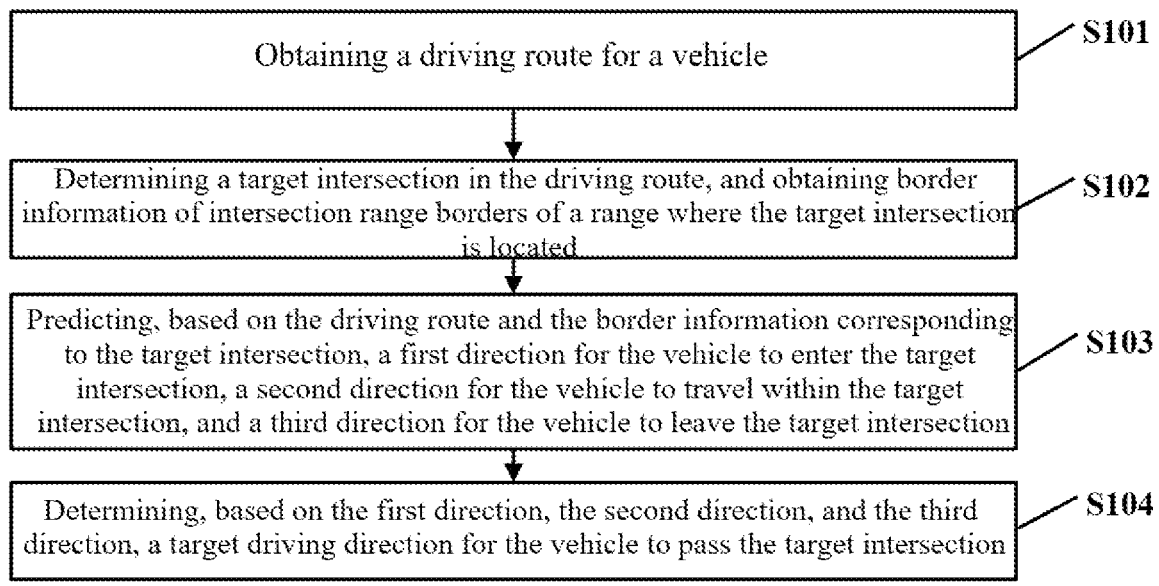
FIG. 1 is a schematic flowchart of a first driving direction determination method provided by an embodiment of the present disclosure.

Referring to FIG. 1, FIG. 1 is a schematic flowchart of a first driving direction determination method provided by an embodiment of the present disclosure. The method includes steps S101 to S104.

Before the steps are described, an execution body of this embodiment of the present disclosure will be described first.

The execution body of this embodiment of the present disclosure may be an electronic device having a driving direction determination function, and the electronic device may be a server, a cloud server, an Internet-enabled terminal device, etc.

Step S101: obtaining a driving route for a vehicle.

The vehicle may be a vehicle currently in motion, or may be a vehicle to be driven.

Road elements or an arrangement sequence of the road elements may be included in the driving route for the vehicle. The road elements are elements that the vehicle is to pass in a driving process, and the road elements may include: a driving start point for the vehicle, a driving termination point for the vehicle, a road that the vehicle passes, and an intersection that the vehicle passes.

Figure 2A:
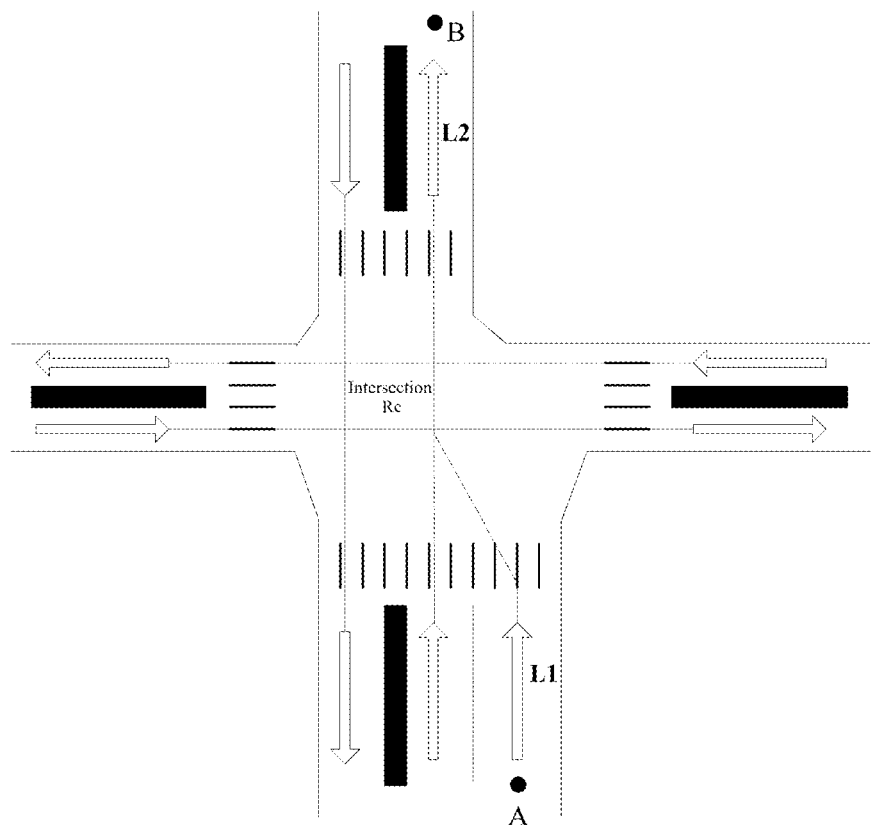
FIG. 2A shows a first road image provided by an embodiment of the present disclosure.

Taking FIG. 2A as an example, FIG. 2A shows a road image, in which A is a driving start point for the vehicle, B is a driving termination point for the vehicle, L1 and L2 are identifiers of roads, and Rc is an identifier of an intersection. When the vehicle is to travel from the point A, successively through the road L1, the intersection Rc, and the road L2, finally to the point B, a driving route for the vehicle may be: A→L1→Rc→L2→B.

Specifically, the driving route for the vehicle may be obtained through at least the following two implementations.

In a first implementation, a user may enter the driving route for the vehicle via a user interface provided by the electronic device, so that the electronic device obtains the driving route for the vehicle.

In a second implementation, the user may enter the driving start point and the driving termination point for the vehicle via the user interface provided by the electronic device, and the electronic device plans a plurality of candidate driving routes for the vehicle based on the driving start point and the driving termination point, displays the plurality of candidate driving routes in the user interface for selection by the user, and uses a candidate driving route selected by the user as the driving route for the vehicle.

Step S102: determining a target intersection in the driving route, and obtaining border information of intersection range borders of a range where the target intersection is located.

The intersection is a road where a plurality of roads meet each other. Taking FIG. 2A as an example, four roads, namely an upper road, a lower road, a left road, and a right road, are included in FIG. 2A, and a road where the four roads meet each other is the intersection.

The target intersection is an intersection that the vehicle passes in the driving route.

In an implementation, each intersection that the vehicle passes in the driving route may be determined as the target intersection. Another implementation of determining the target intersection refers to a subsequent embodiment, and details are not described in detail herein.

The border information is used to describe information about the intersection range borders of the range where the target intersection is located. The border information may include geographic locations and identifiers of the intersection range borders and road identifiers of roads where the intersection range borders are located.

Figure 2B:
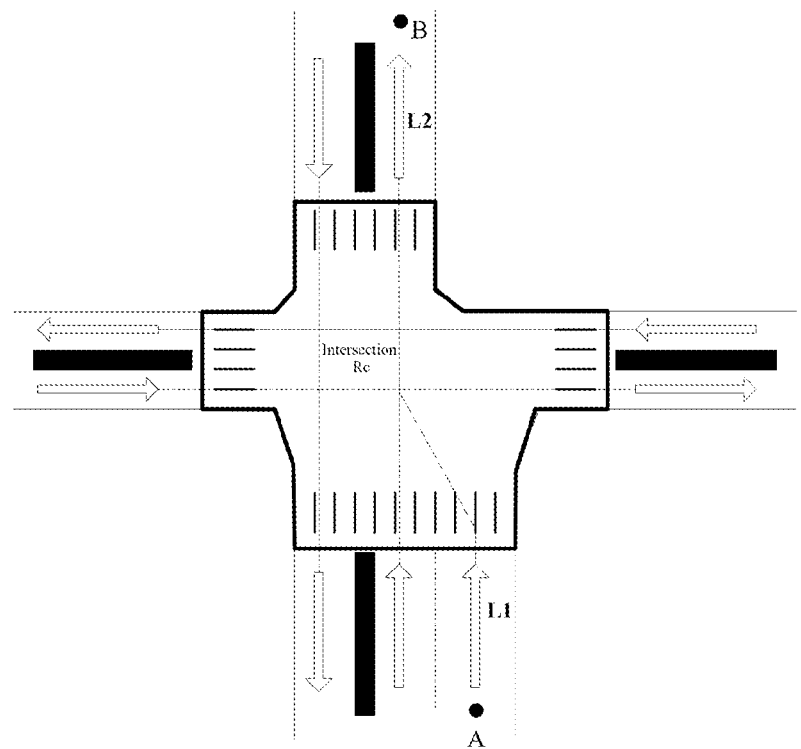
FIG. 2B shows a second road image provided by an embodiment of the present disclosure.

Taking FIG. 2B as an example, FIG. 2B is based on the road image shown in FIG. 2A, with a closed polygon added around the intersection Rc. A range of the closed polygon is a range where the intersection Rc is located, and each side of the closed polygon is an intersection range border of the range where the intersection Rc is located.

The electronic device may prestore border information corresponding to each intersection. Therefore, the border information corresponding to the target intersection may be determined from the prestored border information.

Step S103: predicting, based on the driving route and the border information corresponding to the target intersection, a first direction for the vehicle to enter the target intersection, a second direction for the vehicle to travel within the target intersection, and a third direction for the vehicle to leave the target intersection.

The first direction is a driving direction for the vehicle to enter the target intersection, the second direction is a driving direction for the vehicle within the target intersection, and the third direction is a driving direction when the vehicle leaves the target intersection.

Since the border information corresponding to the target intersection is used to describe the information about the intersection range borders of the range where the target intersection is located, when the vehicle crosses an intersection range border from a road that is not intersection, it indicates that the vehicle enters the intersection; and when the vehicle crosses an intersection range border from a road within the intersection, it indicates that the vehicle leaves the intersection. Therefore, the first direction for the vehicle to enter the target intersection, the second direction for the vehicle to travel within the target intersection, and the third direction for the vehicle to leave the target intersection can be determined based on the driving route and the border information.

In an implementation, the driving route for the vehicle and the border information corresponding to the target intersection may be input to a direction prediction model to obtain the first direction, the second direction, and the third direction that are output from the direction prediction model. The direction prediction model is a model for predicting, based on the driving route and the border information corresponding to the intersection, the direction for the vehicle to enter the intersection, the direction for the vehicle to travel within the intersection, and the direction for the vehicle to leave the intersection.

Figure 3:
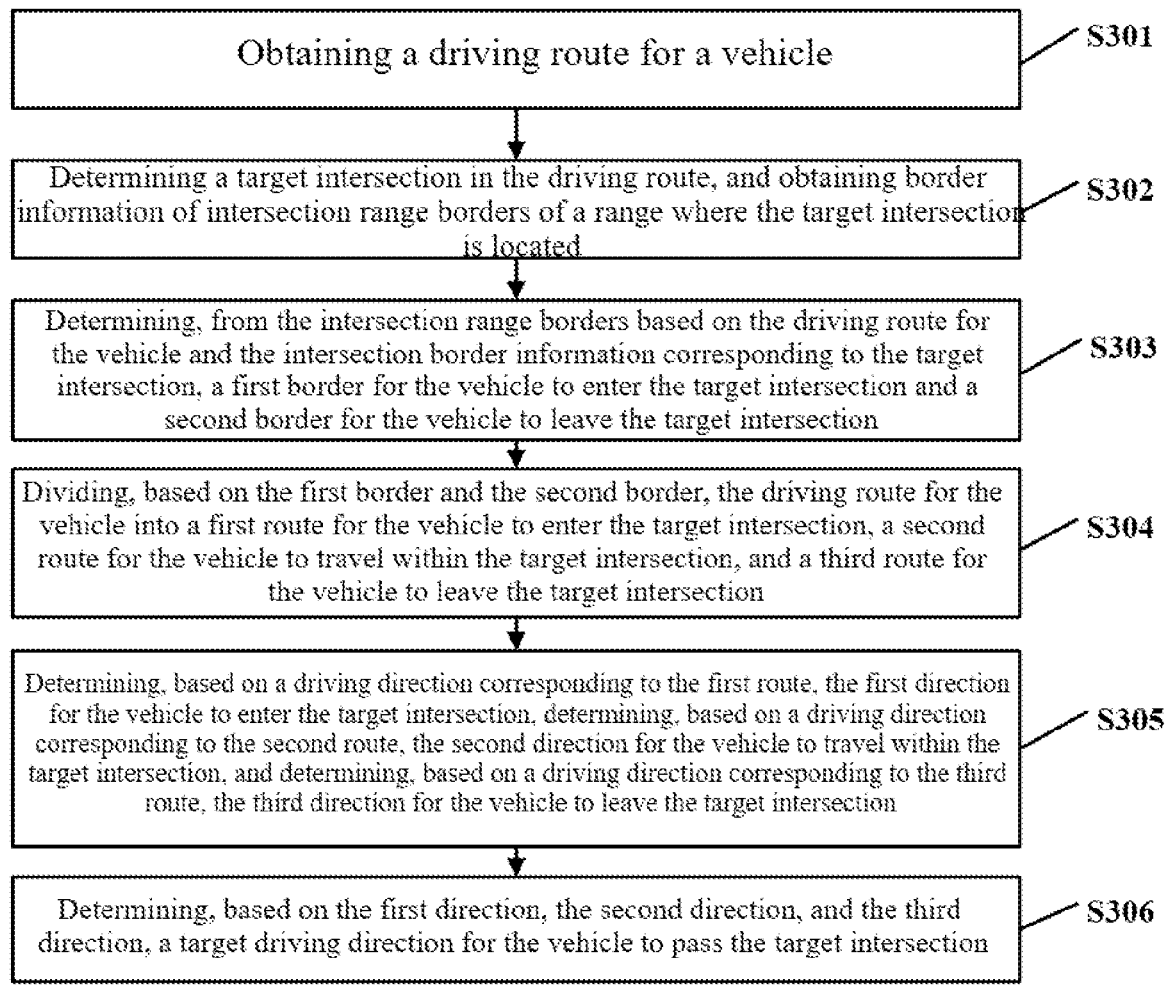
FIG. 3 is a schematic flowchart of a second driving direction determination method provided by an embodiment of the present disclosure.

Another implementation of predicting the three directions refers to a subsequent embodiment corresponding to FIG. 3, which are not described in detail herein.

Step S104: determining, based on the first direction, the second direction, and the third direction, a target driving direction for the vehicle to pass the target intersection.

The target driving direction for the vehicle to pass the target intersection is a driving direction throughout the driving process of the vehicle from entering the target intersection at the beginning to leaving the target intersection. For example, the target driving direction may be straight ahead direction, right front direction, right turn direction, right rear direction, U-turn direction, left rear direction, etc., left turn direction, left front direction, etc.

Since the first direction is the driving direction for the vehicle to enter the target intersection, the second direction is the driving direction for the vehicle to travel within the target intersection, and the third direction is the driving direction when the vehicle leaves the target intersection, and since the driving process for the vehicle to pass the target intersection is divided into a driving phase of entering the target intersection, a driving phase within the target intersection, and a driving phase of leaving the target intersection, the target driving direction for the vehicle to pass the target intersection can be determined based on the first direction, the second direction, and the third direction.

In an implementation, the first direction, the second direction, and the third direction may be input to a pre-trained driving direction computing model, and a driving direction corresponding to the vehicle that is output from the driving direction computing model is output as the target driving direction for the vehicle to pass the target intersection.

The driving direction computing model is a model for computing, based on the direction for the vehicle to enter the intersection, the direction for the vehicle to travel within the intersection, and the direction for the vehicle to leave the intersection, the driving direction for the vehicle to pass the intersection.

Figure 4:
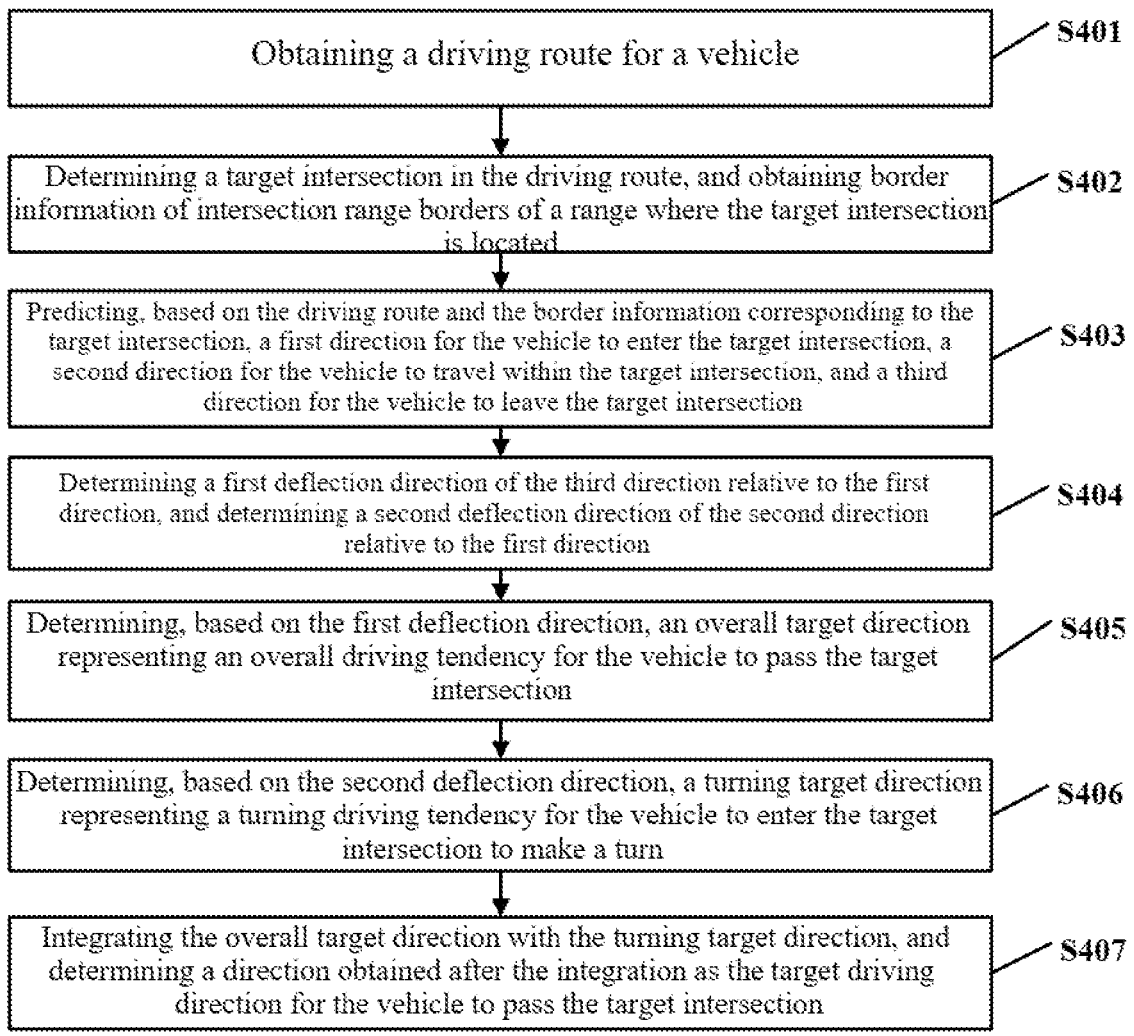
FIG. 4 is a schematic flowchart of a third driving direction determination method provided by an embodiment of the present disclosure.

Another implementation of determining the target driving direction corresponding to the vehicle refers to a subsequent embodiment corresponding to FIG. 4, which are not described in detail herein.

As can be learned from the above description, in the solution provided by this embodiment of the present disclosure, the target driving direction for the vehicle to pass the target intersection is determined based on the first direction, the second direction, and the third direction. Since the first direction is the driving direction for the vehicle to enter the target intersection, the second direction is the driving direction for the vehicle within the target intersection, and the third direction is the driving direction when the vehicle leaves the target intersection, and since the driving process for the vehicle to pass the target intersection is divided into the driving phase of entering the target intersection, the driving phase within the target intersection, and the driving phase of leaving the target intersection, the target driving direction for the vehicle to pass the target intersection can be accurately determined based on the first direction, the second direction, and the third direction.

In addition, when the first direction, the second direction, and the third direction are predicted, the border information corresponding to the target intersection and the driving route for the vehicle is taken into account. Since the border information corresponding to the target intersection can represent the information about the intersection range borders of the range where the target intersection is located, and the driving route for the vehicle can represent information about a route followed when the vehicle travels, and since the first direction, the second direction, and the third direction have an association relationship with the intersection borders of the target intersection and the driving route for the vehicle, the accurate first direction, second direction, and third direction can be obtained based on the driving route for the vehicle and the intersection border information, which further improves the accuracy of the determined target driving direction.

Moreover, compared with a driving direction determination method in the related art, the solution provided by this embodiment of the present disclosure determines the driving direction without using entry links and exit links in an SD road network model, which avoids interference to a determination process of the driving direction due to curvature of the links, thereby improving the accuracy of the determined driving direction.

In an embodiment of the present disclosure, after the target driving direction for the vehicle to pass the target intersection is determined, when it is detected that the vehicle travels to the target intersection, the target driving direction may be broadcasted using voice broadcasts, or the target driving direction may be displayed in the user interface provided by the electronic device, so as to guide the user to drive the vehicle in the target driving direction. For example: when the target driving direction is straight on the right front, the voice broadcasts "Go straight on the right front" may be presented, or the words "Go straight on the right front" may be displayed in a user operating interface. Since a relatively high accuracy of the determined target driving direction corresponding to the vehicle provides an improved accuracy of the voice broadcasts during navigation, so that the user is reasonably guided to drive according to a correct route, avoiding traveling off course; and meanwhile helps improve the accuracy of timing of the voice broadcasts, improving navigation experience for driving.

In step S103 of the embodiment shown in FIG. 1, an implementation of a neural network model may be used to predict the first direction, the second direction, and the third direction; in addition, a method mentioned in an embodiment shown in FIG. 3 may also be used to predict the above directions. In an embodiment of the present disclosure, referring to FIG. 3, a schematic flowchart of a second driving direction determination method is provided. In this embodiment, when the first direction, the second direction, and the third direction are predicted in step S103 of the embodiment shown in FIG. 1, the prediction may be implemented according to steps S303 to S305.

Specifically, the embodiment shown in FIG. 3 includes steps S301 to S306.

Step S301: obtaining a driving route for a vehicle.

Step S302: determining a target intersection in the driving route, and obtaining border information of intersection range borders of a range where the target intersection is located.

Steps S301 and S302 are respectively the same as steps S101 and S102 in the embodiment shown in FIG. 1, and details are not described herein again.

Step S303: determining, from the intersection range borders based on the driving route for the vehicle and the intersection border information corresponding to the target intersection, a first border for the vehicle to enter the target intersection and a second border for the vehicle to leave the target intersection.

In an implementation, when the first border and the second border are determined, two overlapping road identifiers may be determined from first identifiers of roads passed by the vehicle and included in the driving route for the vehicle, and second identifiers of roads where the borders in the intersection border information are located, and an arrangement sequence of the two road identifiers may be determined from an arrangement sequence included in the driving route for the vehicle. A range border included in a road corresponding to the preceding road identifier is determined as the first border, and a range border included in a road corresponding to the following road identifier is determined as the second border.

Figure 2C:
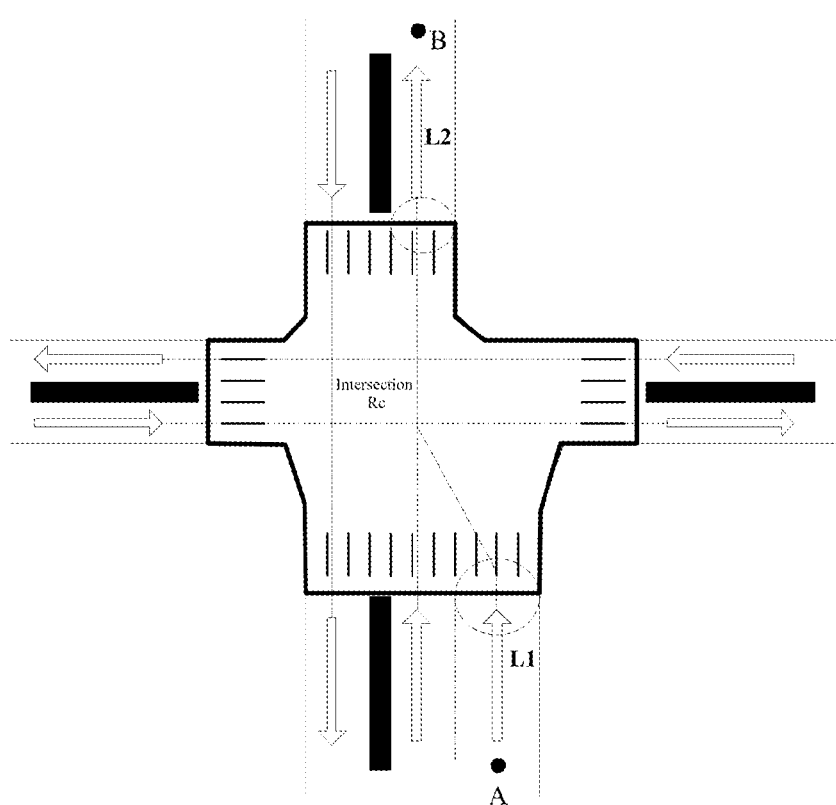
FIG. 2C shows a third road image provided by an embodiment of the present disclosure.

Taking FIG. 2B as an example, in the first identifiers and the second identifiers, the two overlapping road identifiers are L1 and L2 respectively. Since L1 precedes L2 in the arrangement sequence included in the driving route for the vehicle, a range border included in the road L1 is the first border; and a range border included in the road L2 is the second border. As shown in FIG. 2C, an intersection border in a dashed circle in the road L1 in FIG. 2C is the first border, and an intersection border in a dashed circle in the road L2 is the second border.

Step S304: dividing, based on the first border and the second border, the driving route for the vehicle into a first route for the vehicle to enter the target intersection, a second route for the vehicle to travel within the target intersection, and a third route for the vehicle to leave the target intersection.

Specifically, the first route, the second route, and the third route may be determined according to the following two manners.

In a first implementation, a route between a driving start point for the vehicle and the first border in the driving route for the vehicle may be determined as the first route, a route between the first border and the second border in the driving route for the vehicle may be determined as the second route, and a route between the second border and a driving termination point for the vehicle in the driving route for the vehicle may be determined as the third route.

Taking FIG. 2C as an example, in FIG. 2C, a driving start point for the vehicle is A, and a driving termination point is B. The driving route for the vehicle is: A→L1→Rc→L2→B. The first border is between L1 and Rc, and the first route is: A→L1→the first border. The second border is between Rc and L2, and the second route is: the first border→Rc→the second border. The third route is: the second border→L2→B.

In a second implementation, when the first route, the second route, and the third route are determined, a route of a first preset length before the first border in the driving route for the vehicle may be determined as the first route for the vehicle to enter the target intersection; a route between the first border and the second border in the driving route for the vehicle may be determined as the second route for the vehicle to travel within the target intersection; and a route of a second preset length after the second border in the driving route for the vehicle may be determined as the third route for the vehicle to leave the target intersection.

The first preset length may be 20 m, 30 m, 50 m, etc., and the second preset length may be 20 m, 30 m, 50 m, etc. The first preset length and the second preset length may be the same, or may be different.

Figure 2D:
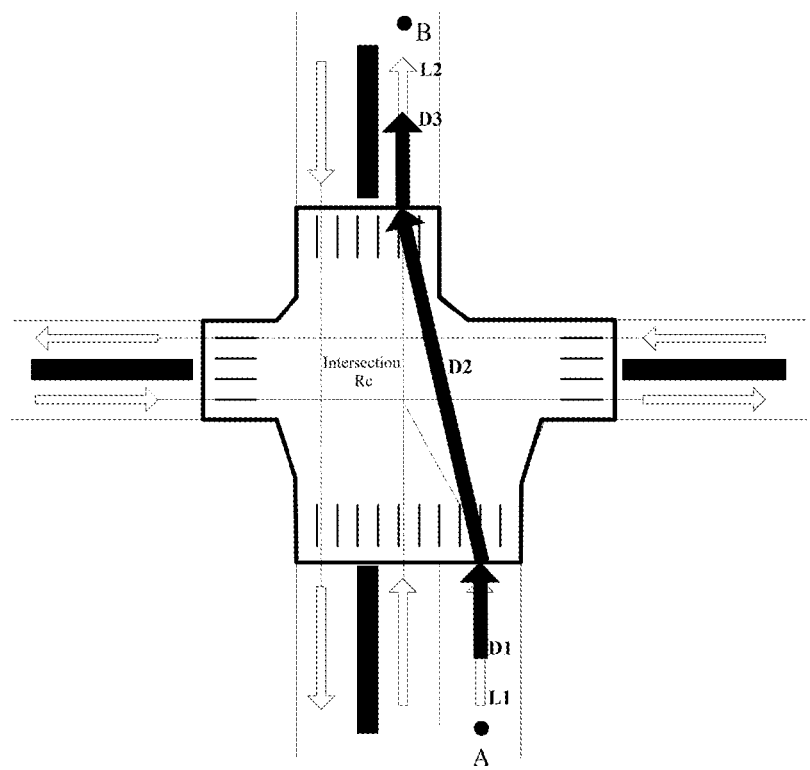
FIG. 2D shows a fourth road image provided by an embodiment of the present disclosure.

Taking FIG. 2D as an example, in FIG. 2D, D1 refers to a route of 50 m before the first border in the driving route for the vehicle, as the first route for the vehicle to enter the target intersection; D2 refers to a route between the first border and the second border in the driving route for the vehicle, as the second route for the vehicle to travel within the target intersection; and D3 refers to a route of 50 m after the second border in the driving route for the vehicle, as the third route for the vehicle to leave the target intersection.

In this way, the route of the first preset length before the first border and the route of the second preset length after the second border are selected, so that the determined first route and third route can accurately represent the route for the vehicle to enter the target intersection and the route for the vehicle to leave the target intersection, respectively. In addition, the route between the first border and the second border in the driving route for the vehicle can reflect the route for the vehicle to travel within the target intersection, and therefore the route between the first border and the second border is determined as the second route with high accuracy.

Step S305: determining, based on a driving direction corresponding to the first route, the first direction for the vehicle to enter the target intersection, determining, based on a driving direction corresponding to the second route, the second direction for the vehicle to travel within the target intersection, and determining, based on a driving direction corresponding to the third route, the third direction for the vehicle to leave the target intersection.

Specifically, the first direction, the second direction, and the third direction may be determined according to the following two implementations.

In a first implementation, when the first route is the route between the driving start point for the vehicle and the first border in the driving route for the vehicle, the second route is the route between the first border and the second border in the driving route for the vehicle, and the third route is the route between the second border and the driving termination point for the vehicle in the driving route for the vehicle, a route of a third preset length before the first border in the first route may be determined, and a driving direction corresponding to the determined route may be determined as the first direction; the driving direction corresponding to the second route may be determined as the second direction; and a route of a fourth preset length after the second border in the third route may be determined, and a driving direction corresponding to the determined route may be determined as the third direction.

In a second implementation, when the first route is the route before the first border in the driving route for the vehicle, the third route is the route after the second border in the driving route for the vehicle, and the second route is the route between the first border and the second border in the driving route for the vehicle, the driving direction corresponding to the first route may be determined as the first direction for the vehicle to enter the target intersection, the driving direction corresponding to the second route may be determined as the second direction for the vehicle to travel within the target intersection, and the driving direction corresponding to the third route may be determined as the third direction for the vehicle to leave the target intersection.

Still referring to FIG. 2D, in FIG. 2D, a driving direction corresponding to D1 is the first direction for the vehicle to enter the target intersection, a driving direction corresponding to D2 is the second direction for the vehicle to travel within the target intersection, and a driving direction corresponding to D3 is the third direction for the vehicle to leave the target intersection.

Step S306: determining, based on the first direction, the second direction, and the third direction, a target driving direction for the vehicle to pass the target intersection.

The step S306 is the same as step S104 in the embodiment shown in FIG. 1, and details are not described herein again.

As can be learned from the above description, since the first border represents the first border for the vehicle to enter the target intersection, and the second border represents the second border for the vehicle to leave the target intersection, the driving route for the vehicle can be divided based on the first border and the second border to accurately obtain the route for the vehicle to enter the target intersection, the route for the vehicle to travel within the target intersection, and the route for the vehicle to leave the target intersection; and then the driving directions corresponding to the three routes are determined as the first direction, the second direction, and the third direction, respectively, thereby improving the accuracy of the determined directions.

In step S104 of the embodiment shown in FIG. 1, in addition to an implementation of a neural network model may be used to determine the target driving direction, a method mentioned in an embodiment shown in FIG. 4 may also be used to determine the target driving direction. In an embodiment of the present disclosure, referring to FIG. 4, a schematic flowchart of a third driving direction determination method is provided. In this embodiment, when the target driving direction is determined in step S104 of the embodiment shown in FIG. 1, the determination may be implemented according to steps S404 to S407.

Specifically, the embodiment shown in FIG. 4 includes steps S401 to S407.

Step S401: obtaining a driving route for a vehicle.

Step S402: determining a target intersection in the driving route, and obtaining border information of intersection range borders of a range where the target intersection is located.

Step S403: predicting, based on the driving route and the border information corresponding to the target intersection, a first direction for the vehicle to enter the target intersection, a second direction for the vehicle to travel within the target intersection, and a third direction for the vehicle to leave the target intersection.

Steps S401 to S403 are respectively the same as steps S101 to S103 in the embodiment shown in FIG. 1, and details are not described herein again.

Step S404: determining a first deflection direction of the third direction relative to the first direction, and determining a second deflection direction of the second direction relative to the first direction.

Step S405: determining, based on the first deflection direction, an overall target direction representing an overall driving tendency for the vehicle to pass the target intersection.

The first deflection direction is a deflection direction of the third direction relative to the first direction, the first direction is a driving direction for the vehicle to enter the target intersection, the third direction is a driving direction for the vehicle to leave the target intersection, and the deflection direction of the third direction relative to the first direction can accurately indicate the overall driving tendency for the vehicle from entering the target intersection to leaving the intersection. Therefore, the overall target direction can be determined based on the first deflection direction.

In an implementation, a deflection angle for the first deflection direction may be obtained, a deflection angle interval into which the deflection angle for the first deflection direction falls may be determined from deflection angle intervals corresponding to preset overall driving directions, and an overall driving direction corresponding to the determined deflection angle interval may be determined as the overall target direction for the vehicle to pass the target intersection.

The preset overall driving directions may be set by working personnel based on experience. For example, the preset overall driving directions may include forward direction, backward direction, turn direction, U-turn direction, straight ahead direction, etc.

For example, if the clockwise direction is taken as the direction of a positive deflection angle, a deflection angle interval corresponding to the straight ahead direction is (−5°, +5°), deflection angle intervals corresponding to the forward direction are (+5°, +75°) and (−75°, −5°), deflection angle intervals corresponding to the turn direction are (+75°, +115°) and (−115°, −75°), deflection angle intervals corresponding to the backward direction are (+115°, +175°) and (−175°, −115°), and deflection angle intervals corresponding to the U-turn direction are (−175°, −180°) and (+175°, +180°). If the deflection angle corresponding to the first deflection direction is 20° and falls into the deflection angle interval (+5°, +75°) corresponding to the forward direction, it indicates that the overall target direction for the vehicle to pass the target intersection is forward.

Step S406: determining, based on the second deflection direction, a turning target direction representing a turning driving tendency for the vehicle to enter the target intersection to make a turn.

Since the second deflection direction is a deflection direction of the second direction relative to the first direction, and the first direction is a driving direction for the vehicle to enter the target intersection, and the second direction is a driving direction for the vehicle to travel within the target intersection, and the deflection direction of the second direction relative to the first direction can accurately indicate the turning driving tendency for the vehicle from starting to enter the target intersection to completely entering the target intersection, the turning target direction can be determined based on the second deflection direction.

In an implementation, a deflection angle for the second deflection direction may be obtained, a deflection angle interval in which the deflection angle for the second deflection direction falls may be determined from deflection angle intervals corresponding to preset turning driving directions, and a turning driving direction corresponding to the determined deflection angle interval may be determined as the turning target direction for the vehicle to pass the target intersection.

The preset turning driving directions may be set by the working personnel based on experience. For example, the preset turning driving directions may include rightward direction, leftward direction, etc.

For example, if the clockwise direction is taken as the direction of a positive deflection angle, a deflection angle interval corresponding to the rightward direction is (0°, +180°), and a deflection angle interval corresponding to the leftward direction is (0°, −180°). If the deflection angle for the second deflection direction is 90° and falls into the deflection angle interval (0°, +180°) corresponding to the rightward direction, it indicates that the turning target direction for the vehicle to pass the target intersection is the rightward direction.

Step S407: integrating the overall target direction with the turning target direction, and determine a direction obtained after the integration as the target driving direction for the vehicle to pass the target intersection.

When the overall target direction is the forward direction, and the turning target direction is the rightward direction, the right forward direction may be obtained by integrating the two directions, that is, the target driving direction for the vehicle to pass the target intersection is the right forward direction.

As can be learned from the above description, since the overall target direction indicates an overall deflection tendency for the vehicle to pass the target intersection, and since the first deflection direction is the deflection direction of the third direction relative to the first direction, the second deflection direction is the deflection direction of the second direction relative to the first direction, the first direction indicates the driving direction for the vehicle to enter the target intersection, the second direction indicates the driving direction for the vehicle to travel within the target intersection, the third direction indicates the driving direction for the vehicle to leave the target intersection, the deflection direction of the third direction relative to the first direction can accurately indicate the overall driving tendency for the vehicle from entering the target intersection to leaving the intersection, and the deflection direction of the second direction relative to the first direction can accurately indicate the turning driving tendency for the vehicle from starting to enter the target intersection to completely entering the target intersection, thus the overall target direction and the turning target direction corresponding to the vehicle can be accurately determined based on the first deflection direction, thereby improving the accuracy of the target driving direction corresponding to the vehicle.

In step S102 of the embodiment shown in FIG. 1, intersections included in the driving route for the vehicle may be determined as target intersections; in addition, the foregoing step S102 may also be implemented according to the following manner.

Whether a preset intersection is present in intersections included in the driving route is determined, and if the preset intersection is present, the preset intersection is determined as the target intersection, and border information corresponding to the preset intersection is determined as the border information of the intersection range borders of the range where the target intersection is located.

The preset intersection may be an intersection set in advance.

In an implementation, identifiers of the intersections included in the driving route may be obtained, and an identifier of the preset intersection may be determined. When an identifier that is the same as the identifier of the preset intersection is present in the identifiers of the intersections, the preset intersection is present in the intersections included in the driving route; and when no identifier that is the same as the identifier of the preset intersection is present in the identifiers of the intersections, the preset intersection is not present in the intersections included in the driving route.

Figure 5A:
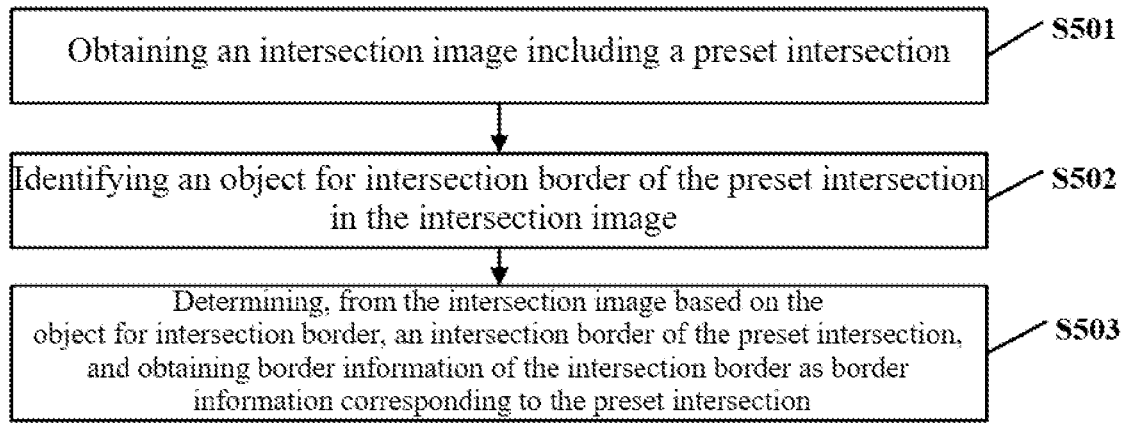
FIG. 5A is a schematic flowchart of a border information determination method provided by an embodiment of the present disclosure.

The border information corresponding to the preset intersection may be predetermined, and a specific determination method can refer to a subsequent embodiment corresponding to FIG. 5A.

When the preset intersection is present, it indicates that an intersection for which a driving direction corresponding to the vehicle needs to be determined is present in the driving route. Therefore, determining the preset intersection as the target intersection improves the efficiency in determining the target intersection, and avoids using, as the target intersection, an intersection for which the driving direction corresponding to the vehicle does not need to be determined, thereby saving computing resources.

A determination process of the border information corresponding to the preset intersection can refer to the embodiment shown in FIG. 5A. FIG. 5A is a schematic flowchart of a border information determination method provided by an embodiment of the present disclosure. The method includes steps S501 to S503.

Step S501: obtaining an intersection image including a preset intersection.

The intersection image may be an SD road network image including the preset intersection. In the SD road network image, a connection relationship between actual roads is represented by a connection relationship between points and lines. An entry link and an exit link are included in the SD road network image. The entry link represents a connecting line for entering an intersection in the SD road network image, and the exit link represents a connecting line for leaving the intersection in the SD road network image.

Step S502: identifying an object for intersection border of the preset intersection in the intersection image.

The object for intersection border is used to represent an object of an intersection range border of a range where the target intersection is located.

When the intersection image is the SD road network image, whether an intersection border image is present in a region including each entry link in the intersection image may be identified. If no, the preset intersection may be marked to prompt working personnel to manually identify the object for intersection border.

When the object for intersection border is identified, in an implementation, a type of each road object included in the intersection image may be identified, and a road object having a road object type identified as a preset intersection border type is determined as the object for intersection border.

The preset road border type may include at least one of the following types: stop line type, crosswalk edge type, and road edge type.

When the preset road border type includes a plurality of preset road border types, road objects may be identified successively according to a priority order of the plurality of types included.

For example, the road border types include stop line type, crosswalk type, and road edge type, where the stop line type has the highest priority, the crosswalk type has the second highest priority, and the road edge type has the lowest priority. Based on the priorities, first, it is identified whether a road object of the stop line type is present in the intersection image, that is, whether a stop line is present. If yes, the identified stop line is determined as the object for intersection border. If no, it is identified whether a road object of the crosswalk type is present in the intersection image, that is, whether a crosswalk is present. If yes, the identified crosswalk is determined as the object for intersection border. If no, it is identified whether a road object of the road edge type is present in the intersection image, that is, whether a road edge is present. If yes, the identified road edge is determined as the object for intersection border.

Step S503: determining, from the intersection image based on the object for intersection border, an intersection border of the preset intersection, and obtaining border information of the intersection border as the border information corresponding to the preset intersection.

In an implementation, a closed polygon of intersection range borders is constructed by extending to the road edge in a vertical or horizontal direction on a basis of the object for intersection border, and connecting two endpoints at a corner of the intersection plane borders by a straight line (the intersection plane borders at the corner may be roughly processed and does not to be refined with precision), and border information of the intersection range borders is obtained, such as geographic locations of the intersection range borders and road identifiers of roads where the borders are located. After the border information of the intersection range borders is determined, a correspondence between the preset intersection and the border information of the intersection range borders may be established, so that the border information corresponding to the preset intersection may be subsequently determined based on the established correspondence.

Figure 5B:
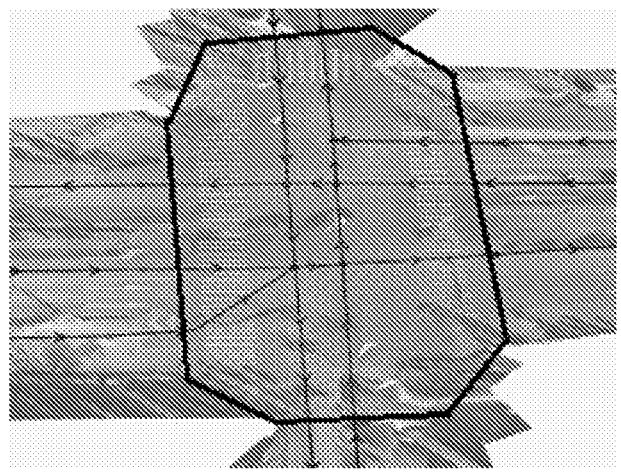
FIG. 5B shows a fifth road image provided by an embodiment of the present disclosure.

Taking FIG. 5B as an example, FIG. 5B shows a road image provided by an embodiment of the present disclosure. Stop lines in the road image shown in FIG. 5B are identified, and a closed polygon of intersection range borders, such as a polygon formed by solid black lines in FIG. 5B, is constructed by extending to road edges in a vertical or horizontal direction on a basis of the stop lines. A range of the polygon indicates the intersection range borders corresponding to the preset intersection.

When it is determined that the intersection range borders of the range of the preset intersection overlap intersection range borders corresponding to another intersection, the determined intersection range borders corresponding to the preset intersection may be adjusted. For example, the originally determined intersection range borders from which an overlapping region is deleted are used as the intersection range borders corresponding to the preset intersection.

As can be learned from the above description, since the object for intersection border can represent a road object present in the intersection range borders corresponding to the preset intersection in the intersection image, thus based on the object for intersection border, the intersection range borders corresponding to the preset intersection can be accurately determined, thereby improving the accuracy of determining the border information.

In an embodiment of the present disclosure, the preset intersection may be set according to the following two implementations.

In a first implementation, complexity of each of candidate intersections may be computed, and the preset intersection may be determined from the candidate intersections based on the intersection complexity of each of the candidate intersections.

Figure 6:
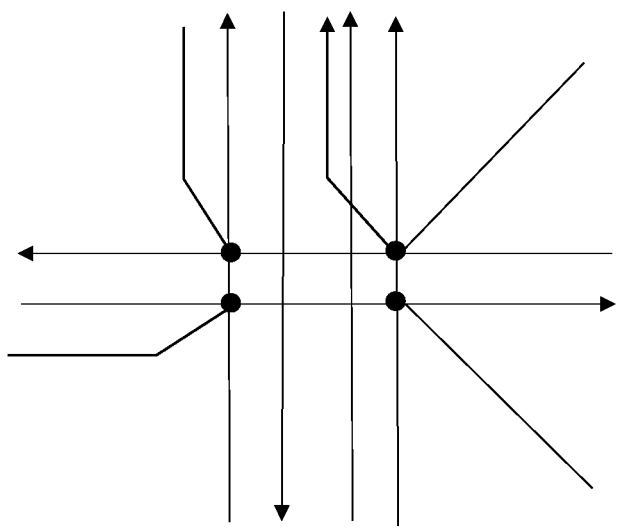
FIG. 6 shows an intersection image provided by an embodiment of the present disclosure.

The intersection complexity is used to represent intersection complexity of a candidate intersection. The higher the intersection complexity, the more complex the candidate intersection. The lower the intersection complexity, the less complex the candidate intersection. As the intersection image shown in FIG. 6, the intersection image shown in FIG. 6 is an image of an abstract representation of an actual intersection image. In FIG. 6, each straight line having an arrow indicates a road, and a region formed by intersecting straight lines is a region of the intersection. As can be seen from FIG. 6, a plurality of roads cross each other, and the complexity of the intersection image shown in FIG. 6 is high.

When the complexity of the candidate intersection is computed, a first quantity of core elements representing the intersection complexity and a second quantity of secondary elements representing the intersection complexity may be determined. Based on weights corresponding to the core elements and weights corresponding to the secondary elements, a weighted sum of the first quantity and the second quantity is calculated and the calculated sum is determined as the complexity of the candidate intersection.

The core elements representing the intersection complexity may include an intersection branch, an intersection node, a dual carriageway (DC), an elevated road, and the like. The secondary elements representing the intersection complexity may include road signs, road guide arrows, traffic lights, and the like.

When the preset intersection is determined, an intersection with complexity greater than a preset complexity threshold may be used as the preset intersection, or a preset number of intersections with the highest complexity may be used as the preset intersection.

Since the preset intersection is determined from the candidate intersections based on the intersection complexity of the candidate intersections, the determined preset intersection and the intersection complexity have an association relationship. An intersection having a high intersection complexity can be subsequently determined as a target intersection, and a driving direction for a vehicle to pass the target intersection can be determined, so as to solve the problem of determining the driving direction corresponding to the vehicle for the intersection having a high intersection complexity.

In a second implementation, an actual driving direction for a test vehicle to pass a candidate intersection is obtained, a preset driving direction, which is predicted using a preset driving direction determination algorithm, for the test vehicle to pass the candidate intersection is obtained, and the candidate intersection is determined as the preset intersection when the actual driving direction differs from a preset driving direction.

The actual driving direction indicates a real driving direction throughout the driving process for the test vehicle from starting to enter the candidate intersection to completely leaving the candidate intersection.

The preset driving direction determination algorithm may be any one of the driving direction determination algorithms in the related art. For example, the preset driving direction determination algorithm may be a driving direction determination algorithm based on an SD intersection model.

When the actual driving direction differs from the preset driving direction, it indicates that the driving direction corresponding to the vehicle and computed using an existing driving direction determination algorithm has a low accuracy. The candidate intersection is determined as the preset intersection, and the preset intersection is subsequently determined as the target intersection, to determine the driving direction for the vehicle to pass the target intersection, so that the problem can be alleviated that the accuracy of the driving direction calculated using the existing driving direction determination algorithm is low.

Through the foregoing two manners of determining the preset intersection, there is no need to manually determine the preset intersection, which greatly reduces costs of production, and achieves the objects of cost reduction, efficiency increase, and rapid mass production.

The driving direction determination solution provided by an embodiment of the present disclosure is described in detail below with reference to FIG. 7.

Figure 7:
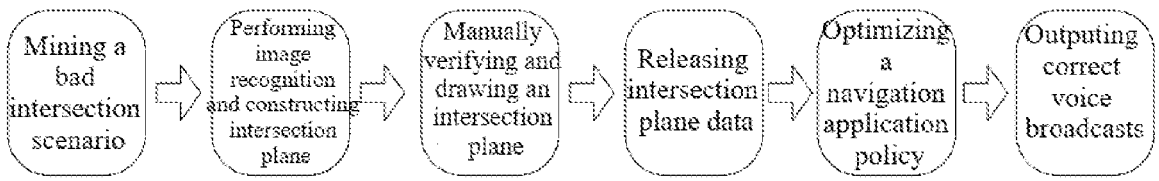
FIG. 7 is a flow block diagram of a driving direction determination method provided by an embodiment of the present disclosure.

FIG. 7 is a flow block diagram of a driving direction determination method provided by an embodiment of the present disclosure. FIG. 7 includes six steps, the first four of which are performed in advance.

According to the direction pointed by arrows, the first step is mining a bad intersection scenario.

In this step, a bad intersection may be determined from candidate intersections based on intersection complexity of each of the candidate intersections. Alternatively, an actual driving direction for a test vehicle to pass a candidate intersection may be obtained, and a predicted driving direction, which is predicted using an SD road network model, for the test vehicle to pass the candidate intersection is obtained. When the actual driving direction differs from a preset driving direction, the candidate intersection is determined as the bad intersection.

The second step is performing image recognition and constructing intersection plane data.

In this step, object identification is performed on each road object included in an image including the bad intersection to identify an object for intersection border representing the border of the intersection in the image, and intersection plane data of a target intersection is determined from an intersection image based on the object for intersection border.

The third step is manually verifying and drawing an intersection plane.

In this step, for an intersection image that is unsuccessfully identified in the second step, manual identification is used to obtain manually determined intersection plane data.

The fourth step is releasing the intersection plane data.

In this step, a correspondence between the intersection plane data and the intersection is established and stored.

The fifth step is optimizing a navigation application policy.

In this step, a driving route for the vehicle is obtained, the intersection plane data corresponding to the intersection is determined based on the intersection included in the driving route and the above correspondence, and a driving direction for the vehicle is determined based on the intersection plane data.

The sixth step is outputting correct voice broadcasts.

When the vehicle travels to the intersection, the driving direction is broadcasted according to the driving direction for the vehicle determined in the fifth step.

Corresponding to the foregoing driving direction determination method, an embodiment of the present disclosure further provides a driving direction determination apparatus.

Figure 8:
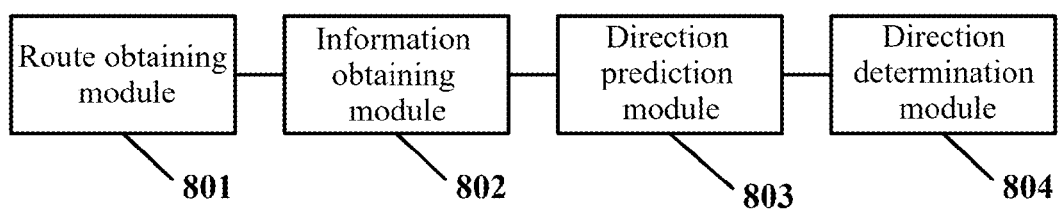
FIG. 8 is a schematic structural diagram of a first driving direction determination apparatus provided by an embodiment of the present disclosure.

Referring to FIG. 8, FIG. 8 is a schematic structural diagram of a first driving direction determination apparatus provided by an embodiment of the present disclosure. The apparatus includes the following modules 801 to 804.

A route obtaining module 801 is used for obtaining a driving route for a vehicle.

An information obtaining module 802 is used for determining a target intersection in the driving route, and obtaining border information of intersection range borders of a range where the target intersection is located.

A direction prediction module 803 is used for predicting, based on the driving route and the border information corresponding to the target intersection, a first direction for the vehicle to enter the target intersection, a second direction for the vehicle to travel within the target intersection, and a third direction for the vehicle to leave the target intersection.

A direction determination module 804 is used for determining, based on the first direction, the second direction, and the third direction, a target driving direction for the vehicle to pass the target intersection.

As can be learned from the above description, in the solution provided by this embodiment of the present disclosure, the target driving direction for the vehicle to pass the target intersection is determined based on the first direction, the second direction, and the third direction. Since the first direction is the driving direction for the vehicle to enter the target intersection, the second direction is the driving direction for the vehicle within the target intersection, and the third direction is the driving direction for the vehicle to leave the target intersection, and since the driving process for the vehicle to pass the target intersection is divided into the driving phase of entering the target intersection, the driving phase within the target intersection, and the driving phase of leaving the target intersection, thus the target driving direction for the vehicle to pass the target intersection can be accurately determined based on the first direction, the second direction, and the third direction.

In addition, when the first direction, the second direction, and the third direction are predicted, the border information corresponding to the target intersection and the driving route for the vehicle are taken into account. Since the border information corresponding to the target intersection can represent the information about the intersection range borders of the range where the target intersection is located, and the driving route for the vehicle can represent information about a route followed when the vehicle travels, and since the first direction, the second direction, and the third direction have an association relationship with the intersection borders of the target intersection and the driving route for the vehicle, thus the accurate first direction, second direction, and third direction can be obtained based on the driving route for the vehicle and the intersection border information, which further improves the accuracy of the determined target driving direction.

Figure 9:
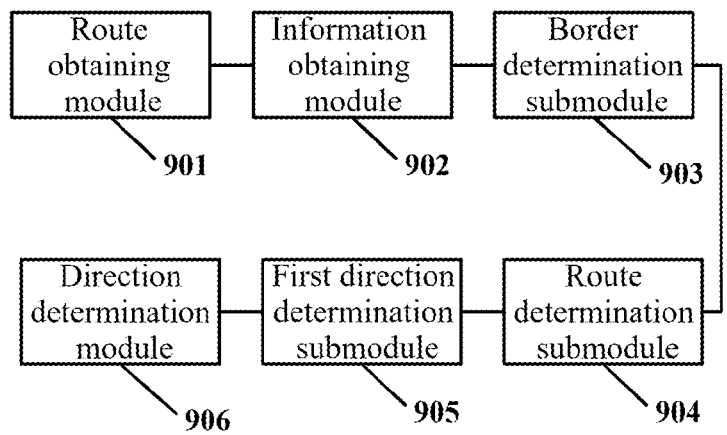
FIG. 9 is a schematic structural diagram of a second driving direction determination apparatus provided by an embodiment of the present disclosure.

Referring to FIG. 9, FIG. 9 is a schematic structural diagram of a second driving direction determination apparatus provided by an embodiment of the present disclosure. The apparatus includes the following modules 901 to 906.

A route obtaining module 901 is used for obtain a driving route for a vehicle.

An information obtaining module 902 is used for determining a target intersection in the driving route, and obtaining border information of intersection range borders of a range where the target intersection is located.

A border determination submodule 903 is used for determining, from the intersection range borders, based on the driving route for the vehicle and the intersection border information corresponding to the target intersection, a first border for the vehicle to enter the target intersection and a second border for the vehicle to leave the target intersection.

A route determination submodule 904 is used for dividing, based on the first border and the second border, the driving route for the vehicle into a first route for the vehicle to enter the target intersection, a second route for the vehicle to travel within the target intersection, and a third route for the vehicle to leave the target intersection.

A first direction determination submodule 905 is used for determining, based on a driving direction corresponding to the first route, the first direction for the vehicle to enter the target intersection, and determining, based on a driving direction corresponding to the second route, the second direction for the vehicle to travel within the target intersection, and determining, based on a driving direction corresponding to the third route, the third direction for the vehicle to leave the target intersection.

A direction determination module 906 is used for determining, based on the first direction, the second direction, and the third direction, a target driving direction for the vehicle to pass the target intersection.

As can be learned from the above description, since the first border is the first border for the vehicle to enter the target intersection, and the second border is the second border for the vehicle to leave the target intersection, the driving route for the vehicle can be divided based on the first border and the second border to accurately obtain the route for the vehicle to enter the target intersection, the route for the vehicle to travel within the target intersection, and the route for the vehicle to leave the target intersection, and then the driving directions corresponding to the three routes are determined as the first direction, the second direction, and the third direction, respectively, thereby improving the accuracy of the determined directions.

In an embodiment of the present disclosure, the route determination submodule 904 is used for: determining a route of a first preset length before the first border in the driving route for the vehicle as the first route for the vehicle to enter the target intersection; determining a route between the first border and the second border in the driving route for the vehicle as the second route for the vehicle to travel within the target intersection; and determining a route of a second preset length after the second border in the driving route for the vehicle as the third route for the vehicle to leave the target intersection.

In this way, the route of the first preset length before the first border and the route of the second preset length after the second border are selected, so that the determined first route and third route can accurately represent the route for the vehicle to enter the target intersection and the route for the vehicle to leave the target intersection, respectively. Besides, the route between the first border and the second border in the driving route for the vehicle can reflect the route for the vehicle to travel within the target intersection, therefore the route between the first border and the second border is determined as the second route with high accuracy.

Figure 10:
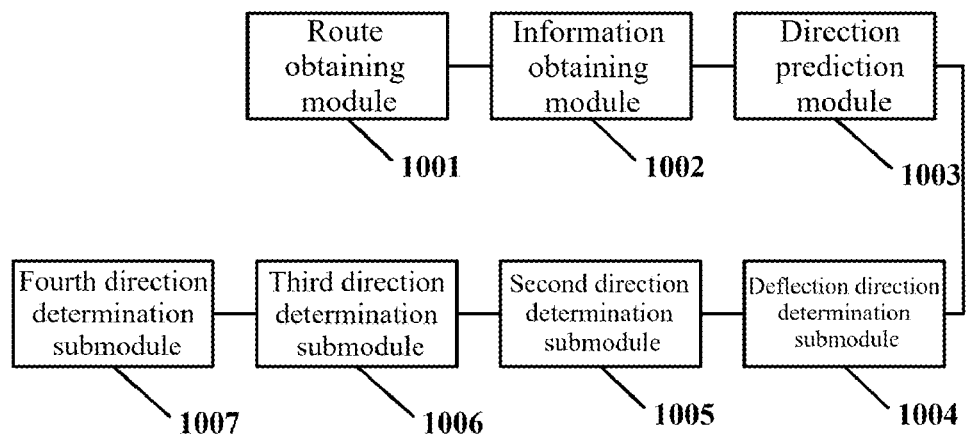
FIG. 10 is a schematic structural diagram of a third driving direction determination apparatus provided by an embodiment of the present disclosure.

Referring to FIG. 10, FIG. 10 is a schematic structural diagram of a third driving direction determination apparatus provided by an embodiment of the present disclosure. The apparatus includes the following modules 1001 to 1007.

A route obtaining module 1001 is used for obtaining a driving route for a vehicle.

An information obtaining module 1002 is used for determining a target intersection in the driving route, and obtaining border information of intersection range borders of a range where the target intersection is located.

A direction prediction module 1003 is used for predicting, based on the driving route and the border information corresponding to the target intersection, a first direction for the vehicle to enter the target intersection, a second direction for the vehicle to travel within the target intersection, and a third direction for the vehicle to leave the target intersection.

A deflection direction determination submodule 1004 is used for determining a first deflection direction of the third direction relative to the first direction, and determining a second deflection direction of the second direction relative to the first direction.

A second direction determination submodule 1005 is used for determining, based on the first deflection direction, an overall target direction representing an overall driving tendency for the vehicle to pass the target intersection.

A third direction determination submodule 1006 is used for determining, based on the second deflection direction, a turning target direction representing a turning driving tendency for the vehicle to enter the target intersection to make a turn.

A fourth direction determination submodule 1007 is used for integrating the overall target direction with the turning target direction, and determining a direction obtained after the integration as the target driving direction for the vehicle to pass the target intersection.

As can be learned from the above description, since the overall target direction indicates an overall deflection tendency for the vehicle to pass the target intersection, and since the first deflection direction is the deflection direction of the third direction relative to the first direction, the second deflection direction is the deflection direction of the second direction relative to the first direction, the first direction indicates the driving direction for the vehicle to enter the target intersection, the second direction indicates the driving direction for the vehicle to travel within the target intersection, the third direction indicates the driving direction for the vehicle to leave the target intersection, the deflection direction of the third direction relative to the first direction can accurately indicate the overall driving tendency for the vehicle from entering the target intersection to leaving the intersection, and the deflection direction of the second direction relative to the first direction can accurately indicate the turning driving tendency for the vehicle from starting to enter the target intersection to completely entering the target intersection, thus the overall target direction and the turning target direction corresponding to the vehicle can be accurately determined based on the first deflection direction, thereby improving the accuracy of the target driving direction corresponding to the vehicle.

In an embodiment of the present disclosure, the information obtaining module includes:
    an intersection determination submodule for determining whether a preset intersection is present in intersections included in the driving route; and if yes, triggering an information obtaining submodule; and
    the information obtaining submodule for determining the preset intersection as the target intersection, and determining border information corresponding to the preset intersection as the border information of the intersection range borders of the range where the target intersection is located.

When the preset intersection is present, it indicates that an intersection for which a driving direction corresponding to the vehicle needs to be determined is present in the driving route. Therefore, determining the preset intersection as the target intersection improves the efficiency in determining the target intersection, and avoids using, as the target intersection, an intersection for which the driving direction corresponding to the vehicle does not need to be determined, thereby saving computing resources.

In an embodiment of the present disclosure, the preset intersection is determined according to the following manner:
    computing intersection complexity of each of candidate intersections, and determining the preset intersection from the candidate intersections based on the intersection complexity of each of the candidate intersections; and/or
    obtaining an actual driving direction for a test vehicle to pass a candidate intersection, and obtaining a preset driving direction, which is predicted using a preset driving direction determination algorithm, for the test vehicle to pass the candidate intersection, and determining the candidate intersection as the preset intersection when the actual driving direction differs from a preset driving direction.

Since the preset intersection is determined from the candidate intersections based on the intersection complexity of each of the candidate intersections, the determined preset intersection and the intersection complexity have an association relationship. An intersection having a high intersection complexity can be subsequently determined as a target intersection, and a driving direction for a vehicle to pass the target intersection can be determined, so as to solve the problem of determining the driving direction corresponding to the vehicle for the intersection having a high intersection complexity. When the actual driving direction differs from the preset driving direction, it indicates that the driving direction corresponding to the vehicle and computed using an existing driving direction determination algorithm has a low accuracy. The candidate intersection is determined as the preset intersection, and the preset intersection is subsequently determined as the target intersection, to determine the driving direction for the vehicle to pass the target intersection, so that the problem can be alleviated that the accuracy of the driving direction calculated using the existing driving direction determination algorithm is low.

In an embodiment of the present disclosure, the border information corresponding to the preset intersection is determined according to the following manner:

obtaining an intersection image including the preset intersection;

identifying an object for intersection border of the preset intersection in the intersection image; and determining, from the intersection image based on the object for intersection border, an intersection border of the preset intersection, to obtain border information of the intersection border as the border information corresponding to the preset intersection.

As can be learned from the above description, since the object for intersection border can represent a road object present in the intersection range borders corresponding to the preset intersection in the intersection image, thus based on the object for intersection border, the intersection range borders corresponding to the preset intersection can be accurately determined, thereby improving the accuracy of determining the border information.

In the technical solutions of the present disclosure, the collection, storage, use, processing, transmission, provision, disclosure, etc. of the user's personal information involved all comply with related laws and regulations and are not against the public order and good morals.

According to an embodiment of the present disclosure, the present disclosure further provides an electronic device, a readable storage medium, and a computer program product.

In an embodiment of the present disclosure, an electronic device is provided, including:

at least one processor; and a memory communicatively connected to the at least one processor, where the memory stores instructions executable by the at least one processor, which, when executed by the at least one processor, cause the at least one processor to perform the foregoing driving direction determination method.

In an embodiment of the present disclosure, a non-transitory computer-readable storage medium storing computer instructions is provided, where the computer instructions are executed to cause the computer to perform the foregoing driving direction determination method.

In an embodiment of the present disclosure, a computer program product including a computer program is provided, which when executed by a processor, implements the foregoing driving direction determination method.

Figure 11:
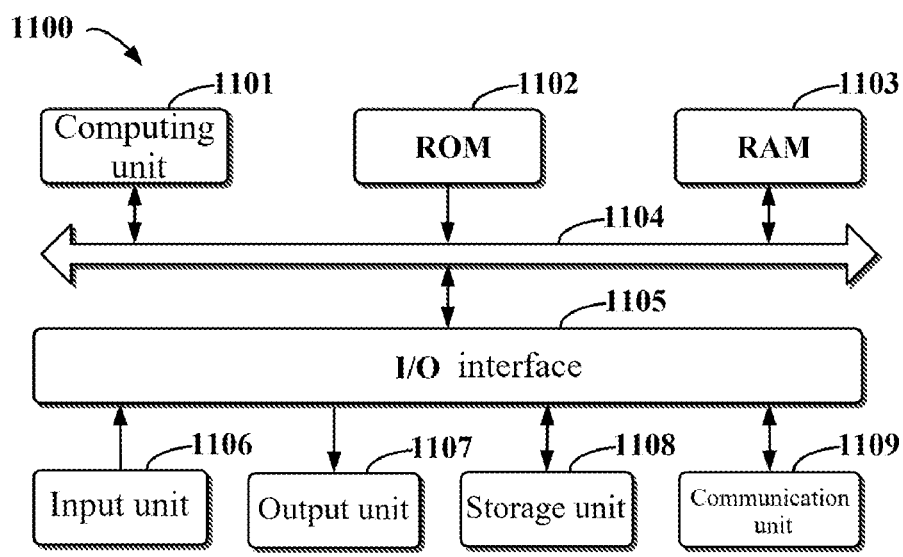
FIG. 11 is a schematic structural diagram of an electronic device provided by an embodiment of the present disclosure.

FIG. 11 is a schematic block diagram of an example electronic device 1100 that can be used to implement an embodiment of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 11, the device 1100 includes a computing unit 1101, which may perform various appropriate actions and processing according to a computer program stored in a read-only memory (ROM) 1102 or a computer program loaded from a storage unit 1108 to a random access memory (RAM) 1103. The RAM 1103 may further store various programs and data required for the operation of the device 1100. The computing unit 1101, the ROM 1102, and the RAM 1103 are connected to each other through a bus 1104. An input/output (I/O) interface 1105 is also connected to the bus 1104.

A plurality of components in the device 1100 are connected to the I/O interface 1105, including: an input unit 1106, such as a keyboard or a mouse; an output unit 1107, such as various types of displays or speakers; a storage unit 1108, such as a magnetic disk or an optical disc; and a communication unit 1109, such as a network interface card, a modem, or a wireless communication transceiver. The communication unit 1109 allows the device 1100 to exchange information/data with other devices through a computer network, such as the Internet, and/or various telecommunications networks.

The computing unit 1101 may be various general-purpose and/or special-purpose processing components with processing and computing capabilities. Some examples of the computing unit 1101 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 1101 performs the various methods and processing described above, for example, the driving direction determination method. For example, in some embodiments, the driving direction determination method may be implemented as a computer software program, which is tangibly contained in a machine-readable medium, such as the storage unit 1108. In some embodiments, a part or all of the computer program may be loaded and/or installed onto the device 1100 via the ROM 1102 and/or the communication unit 1109. When the computer program is loaded onto the RAM 1103 and executed by the computing unit 1101, one or more steps of the driving direction determination method described above can be performed. Alternatively, in other embodiments, the computing unit 1101 may be configured, by any other suitable means (for example, by means of firmware), to perform the driving direction determination method.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. Embodiments of the present disclosure may be implemented in one or more computer programs, which may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in one or more programming languages or any combination thereof. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) for displaying information to the user; and a keyboard and a pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

The example implementations above do not constitute a limitation on the protection scope of the present disclosure. Those skilled in the art should understand that various modifications, combinations, sub-combinations, and replacements can be made based on design requirements and other factors. Any modifications, equivalent replacements, improvements, etc. within the spirit and principle of the present disclosure shall fall within the protection scope of the present disclosure.

What is claimed is:

1. A method for determining a driving direction, executed by an electronic device, the method comprising:
   obtaining a driving route for a vehicle;
   determining a target intersection in the driving route, and obtaining border information about intersection range borders defining a range of the target intersection, wherein the target intersection is an intersection in the driving route where a driving direction corresponding to the vehicle needs to be determined, and wherein determining the target intersection in the driving route, and obtaining the border information about intersection range borders defining the range of the target intersection comprises:
      determining whether a preset intersection is present in intersections included in the driving route, wherein determining whether the preset intersection is present in intersections included in the driving route comprises: obtaining an actual driving direction for a test vehicle to pass a candidate intersection, obtaining a preset driving direction that is predicted using a preset driving direction determination algorithm for the test vehicle to pass the candidate intersection, and determining the candidate intersection as the preset intersection when the actual driving direction differs from the preset driving direction, wherein the preset driving direction determination algorithm includes a driving direction determination algorithm based on a standard definition (SD) intersection model, wherein the SD intersection model is determined based on an actual road center line, and wherein the driving direction determination algorithm computes the preset driving direction based on an entry link and an exit link in the SD intersection model; and
      in response to determining that the preset intersection is present in the intersections included in the driving route, determining the preset intersection as the target intersection, and determining border information corresponding to the preset intersection as the border information about the intersection range borders defining the range of the target intersection;

predicting, based on the driving route and the border information corresponding to the target intersection, a first direction for the vehicle to enter the target intersection, a second direction for the vehicle to travel within the target intersection, and a third direction for the vehicle to leave the target intersection;

determining, based on the first direction, the second direction, and the third direction, a target driving direction for the vehicle to pass the target intersection; and in response to detecting that the vehicle travels to the target intersection, guiding a user to drive the vehicle in the target driving direction by executing at least one of following operations: broadcasting the target driving direction by using voice broadcasts through a speaker of the electronic device, or displaying the target driving direction in a user interface on a display of the electronic device.

2. The method according to claim 1, wherein the predicting, based on the driving route and the border information corresponding to the target intersection, the first direction for the vehicle to enter the target intersection, the second direction for the vehicle to travel within the target intersection, and the third direction for the vehicle to leave the target intersection comprises:

determining, from the intersection range borders, based on the driving route for the vehicle and the border information corresponding to the target intersection, a first border for the vehicle to enter the target intersection and a second border for the vehicle to leave the target intersection;

dividing, based on the first border and the second border, the driving route for the vehicle into a first route for the vehicle to enter the target intersection, a second route for the vehicle to travel within the target intersection, and a third route for the vehicle to leave the target intersection;

determining, based on a driving direction corresponding to the first route, the first direction for the vehicle to enter the target intersection;

determining, based on a driving direction corresponding to the second route, the second direction for the vehicle to travel within the target intersection; and determining, based on a driving direction corresponding to the third route, the third direction for the vehicle to leave the target intersection.

3. The method according to claim 2, wherein the dividing, based on the first border and the second border, the driving route for the vehicle into the first route for the vehicle to enter the target intersection, the second route for the vehicle to travel within the target intersection, and the third route for the vehicle to leave the target intersection comprises:

determining a route of a first preset length before the first border in the driving route for the vehicle as the first route for the vehicle to enter the target intersection;

determining a route between the first border and the second border in the driving route for the vehicle as the second route for the vehicle to travel within the target intersection; and determining a route of a second preset length after the second border in the driving route for the vehicle as the third route for the vehicle to leave the target intersection.

4. The method according to claim 1, wherein the determining, based on the first direction, the second direction, and the third direction, the target driving direction for the vehicle to pass the target intersection comprises:

determining a first deflection direction of the third direction relative to the first direction, and determining a second deflection direction of the second direction relative to the first direction;

determining, based on the first deflection direction, an overall target direction representing an overall driving tendency for the vehicle to pass the target intersection;

determining, based on the second deflection direction, a turning target direction representing a turning driving tendency for the vehicle to enter the target intersection to make a turn; and integrating the overall target direction with the turning target direction, and determining a direction obtained after the integration as the target driving direction for the vehicle to pass the target intersection.

5. The method according to claim 1, wherein the determining the border information corresponding to the preset intersection as the border information about the intersection range borders defining the range of the target intersection comprises:

obtaining an intersection image including the preset intersection;

identifying an object for intersection border of the preset intersection in the intersection image; and determining, from the intersection image based on the object for intersection border, intersection borders where the preset intersection is located, and obtaining border information of the intersection borders as the border information corresponding to the preset intersection.

6. An electronic device, comprising:

at least one processor; and a memory communicatively connected to the at least one processor, wherein the memory stores instructions executable by the at least one processor, the instructions being executed by the at least one processor to cause the at least one processor to perform actions including:

obtaining a driving route for a vehicle;

determining a target intersection in the driving route, and obtaining border information about intersection range borders defining a range of the target intersection, wherein the target intersection is an intersection in the driving route where a driving direction corresponding to the vehicle needs to be determined, and wherein determining the target intersection in the driving route, and obtaining the border information about intersection range borders defining the range of the target intersection comprises:

determining whether a preset intersection is present in intersections included in the driving route, wherein determining whether the preset intersection is present in intersections included in the driving route comprises: obtaining an actual driving direction for a test vehicle to pass a candidate intersection, obtaining a preset driving direction that is predicted using a preset driving direction determination algorithm for the test vehicle to pass the candidate intersection, and determining the candidate intersection as the preset intersection when the actual driving direction differs from the preset driving direction, wherein the preset driving direction determination algorithm includes a driving direction determination algorithm based on a standard definition (SD) intersection model, wherein the SD intersection model is determined based on an actual road center line, and wherein the driving direction determination algorithm computes the preset driving direction based on an entry link and an exit link in the SD intersection model; and in response to determining that the preset intersection is present in the intersections included in the driving route, determining the preset intersection as the target intersection, and determining border information corresponding to the preset intersection as the border information about the intersection range borders defining the range of the target intersection;

predicting, based on the driving route and the border information corresponding to the target intersection, a first direction for the vehicle to enter the target intersection, a second direction for the vehicle to travel within the target intersection, and a third direction for the vehicle to leave the target intersection;

determining, based on the first direction, the second direction, and the third direction, a target driving direction for the vehicle to pass the target intersection; and in response to detecting that the vehicle travels to the target intersection, guiding a user to drive the vehicle in the target driving direction by executing at least one of following operations: broadcasting the target driving direction by using voice broadcasts through a speaker of the electronic device, or displaying the target driving direction in a user interface on a display of the electronic device.

7. The electronic device according to claim 6, wherein the predicting, based on the driving route and the border information corresponding to the target intersection, the first direction for the vehicle to enter the target intersection, the second direction for the vehicle to travel within the target intersection, and the third direction for the vehicle to leave the target intersection comprises:

determining, from the intersection range borders, based on the driving route for the vehicle and the border information corresponding to the target intersection, a first border for the vehicle to enter the target intersection and a second border for the vehicle to leave the target intersection;

dividing, based on the first border and the second border, the driving route for the vehicle into a first route for the vehicle to enter the target intersection, a second route for the vehicle to travel within the target intersection, and a third route for the vehicle to leave the target intersection;

determining, based on a driving direction corresponding to the first route, the first direction for the vehicle to enter the target intersection;

determining, based on a driving direction corresponding to the second route, the second direction for the vehicle to travel within the target intersection; and determining, based on a driving direction corresponding to the third route, the third direction for the vehicle to leave the target intersection.

8. The electronic device according to claim 7, wherein the dividing, based on the first border and the second border, the driving route for the vehicle into the first route for the vehicle to enter the target intersection, the second route for the vehicle to travel within the target intersection, and the third route for the vehicle to leave the target intersection comprises:

determining a route of a first preset length before the first border in the driving route for the vehicle as the first route for the vehicle to enter the target intersection;

determining a route between the first border and the second border in the driving route for the vehicle as the second route for the vehicle to travel within the target intersection; and determining a route of a second preset length after the second border in the driving route for the vehicle as the third route for the vehicle to leave the target intersection.

9. The electronic device according to claim 6, wherein the determining, based on the first direction, the second direction, and the third direction, the target driving direction for the vehicle to pass the target intersection comprises:

determining a first deflection direction of the third direction relative to the first direction, and determining a second deflection direction of the second direction relative to the first direction;

determining, based on the first deflection direction, an overall target direction representing an overall driving tendency for the vehicle to pass the target intersection;

determining, based on the second deflection direction, a turning target direction representing a turning driving tendency for the vehicle to enter the target intersection to make a turn; and integrating the overall target direction with the turning target direction, and determining a direction obtained after the integration as the target driving direction for the vehicle to pass the target intersection.

10. The electronic device according to claim 6, wherein the determining the border information corresponding to the preset intersection as the border information about the intersection range borders defining the range of the target intersection comprises:

obtaining an intersection image including the preset intersection;

identifying an object for intersection border of the preset intersection in the intersection image; and determining, from the intersection image based on the object for intersection border, intersection borders where the preset intersection is located, and obtaining border information of the intersection borders as the border information corresponding to the preset intersection.

11. A non-transitory computer-readable storage medium storing computer instructions, wherein the computer instructions, when executed by a computer, cause the computer to perform actions including:

obtaining a driving route for a vehicle;

determining a target intersection in the driving route, and obtaining border information about intersection range borders defining a range of the target intersection, wherein the target intersection is an intersection in the driving route where a driving direction corresponding to the vehicle needs to be determined, and wherein determining the target intersection in the driving route, and obtaining the border information about intersection range borders defining the range of the target intersection comprises:

determining whether a preset intersection is present in intersections included in the driving route, wherein determining whether the preset intersection is present in intersections included in the driving route comprises: obtaining an actual driving direction for a test vehicle to pass a candidate intersection, obtaining a preset driving direction that is predicted using a preset driving direction determination algorithm for the test vehicle to pass the candidate intersection, and determining the candidate intersection as the preset intersection when the actual driving direction differs from the preset driving direction, wherein the preset driving direction determination algorithm includes a driving direction determination algorithm based on a standard definition (SD) intersection model, wherein the SD intersection model is determined based on an actual road center line, and wherein the driving direction determination algorithm computes the preset driving direction based on an entry link and an exit link in the SD intersection model; and in response to determining that the preset intersection is present in the intersections included in the driving route, determining the preset intersection as the target intersection, and determining border information corresponding to the preset intersection as the border information about the intersection range borders defining the range of the target intersection;

predicting, based on the driving route and the border information corresponding to the target intersection, a first direction for the vehicle to enter the target intersection, a second direction for the vehicle to travel within the target intersection, and a third direction for the vehicle to leave the target intersection;

determining, based on the first direction, the second direction, and the third direction, a target driving direction for the vehicle to pass the target intersection; and in response to detecting that the vehicle travels to the target intersection, guiding a user to drive the vehicle in the target driving direction by executing at least one of following operations: broadcasting the target driving direction by using voice broadcasts through a speaker of the electronic device, or displaying the target driving direction in a user interface on a display of the electronic device.

12. The non-transitory computer-readable storage medium according to claim 11, wherein the predicting, based on the driving route and the border information corresponding to the target intersection, the first direction for the vehicle to enter the target intersection, the second direction for the vehicle to travel within the target intersection, and the third direction for the vehicle to leave the target intersection comprises:

determining, from the intersection range borders, based on the driving route for the vehicle and the border information corresponding to the target intersection, a first border for the vehicle to enter the target intersection and a second border for the vehicle to leave the target intersection;

dividing, based on the first border and the second border, the driving route for the vehicle into a first route for the vehicle to enter the target intersection, a second route for the vehicle to travel within the target intersection, and a third route for the vehicle to leave the target intersection;

determining, based on a driving direction corresponding to the first route, the first direction for the vehicle to enter the target intersection;

determining, based on a driving direction corresponding to the second route, the second direction for the vehicle to travel within the target intersection; and determining, based on a driving direction corresponding to the third route, the third direction for the vehicle to leave the target intersection.

13. The non-transitory computer-readable storage medium according to claim 12, wherein the dividing, based on the first border and the second border, the driving route for the vehicle into the first route for the vehicle to enter the target intersection, the second route for the vehicle to travel within the target intersection, and the third route for the vehicle to leave the target intersection comprises:

determining a route of a first preset length before the first border in the driving route for the vehicle as the first route for the vehicle to enter the target intersection;

determining a route between the first border and the second border in the driving route for the vehicle as the second route for the vehicle to travel within the target intersection; and determining a route of a second preset length after the second border in the driving route for the vehicle as the third route for the vehicle to leave the target intersection.

14. The non-transitory computer-readable storage medium according to claim 11, wherein the determining, based on the first direction, the second direction, and the third direction, the target driving direction for the vehicle to pass the target intersection comprises:

determining a first deflection direction of the third direction relative to the first direction, and determining a second deflection direction of the second direction relative to the first direction:

determining, based on the first deflection direction, an overall target direction representing an overall driving tendency for the vehicle to pass the target intersection;

determining, based on the second deflection direction, a turning target direction representing a turning driving tendency for the vehicle to enter the target intersection to make a turn; and integrating the overall target direction with the turning target direction, and determining a direction obtained after the integration as the target driving direction for the vehicle to pass the target intersection.

* * * * *